UNITED STATES PATENT OFFICE.

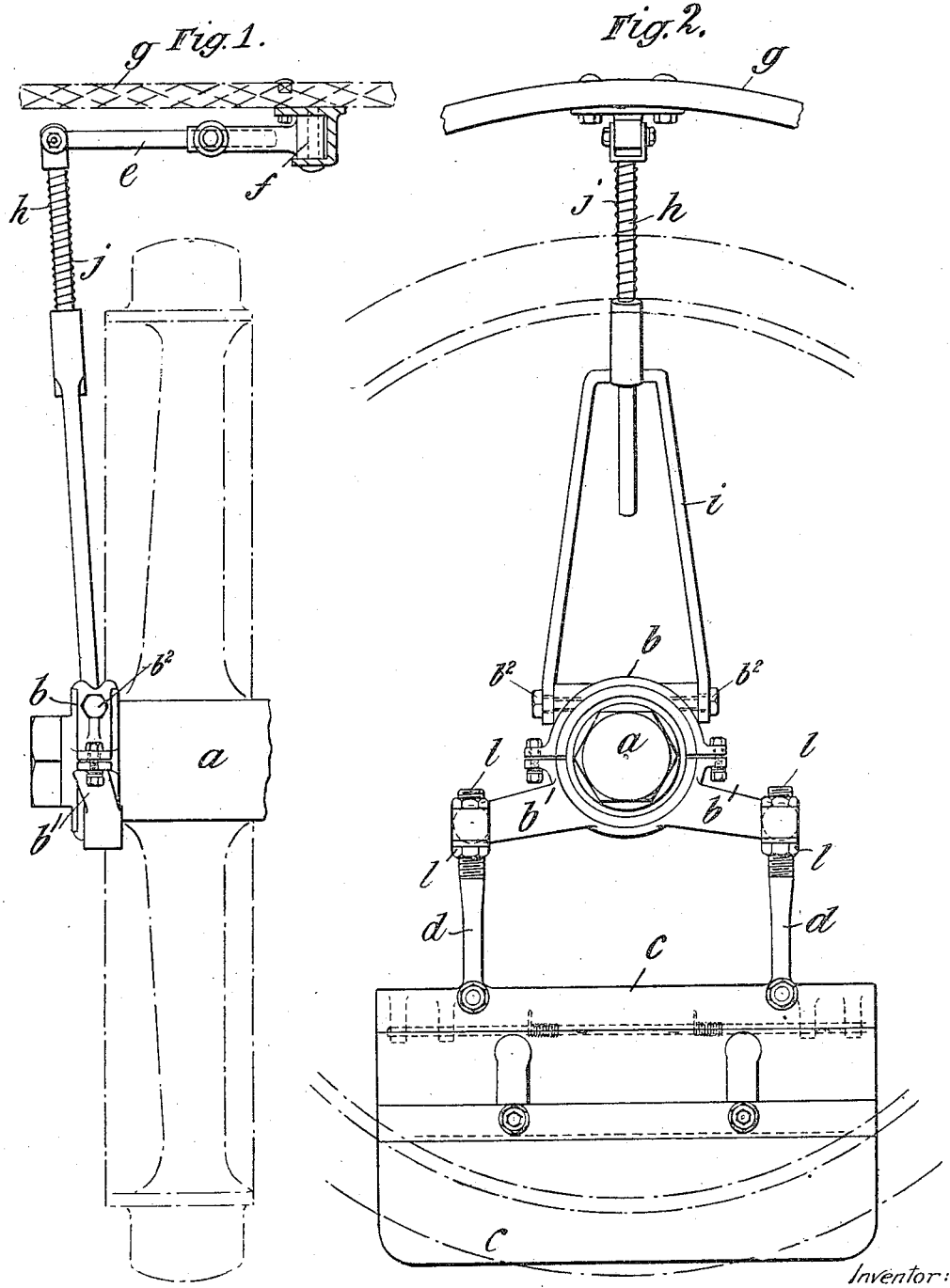

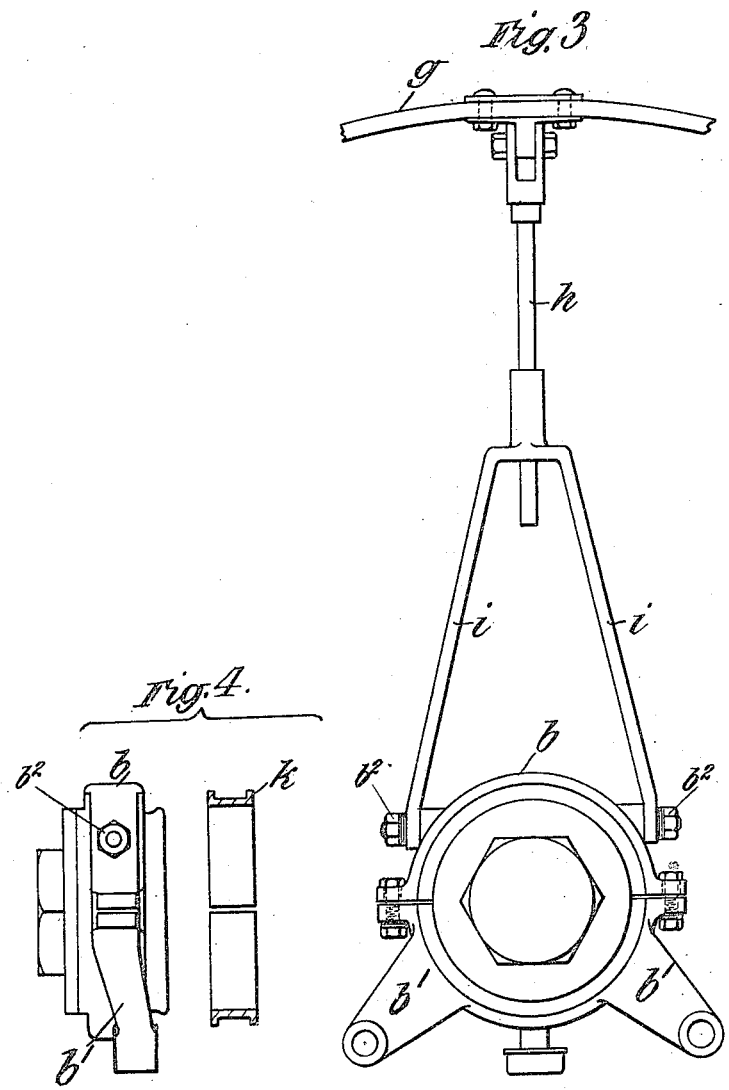

HARRY VOLLER NORRIS GRAVELEY, OF LONDON, ENGLAND.

SIDE SPLASH-GUARD FOR MOTOR-VEHICLES AND OTHER ROAD-VEHICLES.

1,253,959.  Specification of Letters Patent.  Patented Jan. 15, 1918.

Application filed June 30, 1915. Serial No. 37,334.

*To all whom it may concern:*

Be it known that I, HARRY VOLLER NORRIS GRAVELEY, a subject of the King of Great Britain, residing at Seymour House, 17 Waterloo Place, in the county of London, England, have invented certain new and useful Improvements in or Relating to Side Splash-Guards for Motor and other Road Vehicles, of which the following is a specification.

This invention relates to wheel guards for motor and other road vehicles and particularly to side splash guards which are carried by the hub or axle of the wheel and connected with suitable non-rigid devices extending into the proximity of the usual mud guard or the body of the vehicle, the chief object being to provide what I term a control arrangement which is adapted to permit of vertical and lateral movements or displacements of the vehicle body, relatively to the wheels or vice versa, without affecting the position of the splash guard relatively to the wheel or road surface. A further object is to provide a guard which will be less liable to be broken or become damaged when obstructions are encountered.

According to the invention the splash guard made preferably in two parts, is provided with a control device adapted to move about pivotal connections, the axes of which are disposed in a plane or planes parallel to the plane of the wheel and by preference also to permit of the vertical displacement of the vehicle body relatively to the wheels or axles. The hub bearing to which the control devices are pivotally connected will preferably be made in halves provided with or mounted on an antifriction ring (which may also be divided) adapted to fit the hub, the two parts of the bearing being secured together by means of bolts or other appropriate means, and the lower half of the bearing being formed integral with the arms for carrying the guard.

In order that the invention may be clearly understood and readily carried into effect the same will now be described more fully with reference to the accompanying drawing, in which:—

Figure 1 is an edge view of a side splash guard as applied to one of the front wheels of a motor vehicle.

Fig. 2 is a face view of Fig. 1.

Fig. 3 is a similar view to Fig. 2 showing a modification hereinafter explained and intended for use with the rear wheels of a motor vehicle.

Fig. 4 is a detail showing the hub bearing partly in section.

$a$ indicates the hub of the wheel, $b$ the bearing rotatably mounted thereon, and $c$ the splash guard supported by links $d$ from the arms $b'$ of the bearing. The control devices comprise, in the case of the front or steering wheels of the vehicle, an arm or lever $e$ mounted to swing about a fulcrum or pivot $f$ on the mud guard $g$ or on the body of the vehicle; preferably at a point directly over the vertical pin connecting the wheel with the axle. At its other end the lever or arm $e$ is attached to a vertical rod $h$ slidably mounted in a tubular boss or bearing forming part of a yoke or stirrup piece $i$ which pivotally connects with the bearing $b$ at $b^2$ (see Fig. 2). On the rod $h$ between the end of the arm $e$ and the boss of the yoke $i$, is mounted a spring $j$ while the connections between the arm and rod as well as between the yoke and bearing are such that the several parts are capable of turning relatively to each other. That is to say, the joints are flexible and adapted to permit of a hinging movement of one part of the control device relatively to another part, and the spring $j$ serves to absorb the vibrations transmitted to the rod from the vehicle wheel.

Any sudden turning or vertical displacement of the wheel and consequently of the side guard $c$ relatively to the mud guard $g$ will be allowed for by the free turning and sliding of the yoke $i$ on the rod $h$. On the other hand any lateral movement or displacement of the body relatively to the wheel cannot effect the side guard $c$ inasmuch as the arm $e$ and yoke $i$ will, by reason of their pivotal connections with each other and the mud guard or vehicle and the bearing $b$ respectively allow for such displacement; in other words the control device will adapt itself to the varying conditions set up by the oscillations of the vehicle body without transmitting movement to the splash guard. Further, the control arm $e$ being fulcrumed at a point directly above the wheel connecting pin, any angular displacement of the wheel and mudguard $g$ relatively to one another will be compensated for by the control devices without risk of breaking or damaging the guard; at the same time the guard $c$ will be prevented from tilting and thereby always kept in a parallel position relatively to the road surface.

The arm $e$ will preferably be made telescopic or in two parts as shown so as to allow for adjustment according to the type of vehicle or to the position thereon at which it may be desired to arrange the fulcrum.

In connection with the rear wheel attachment of the guard the spring $j$ may be omitted and the rod $h$ pivotally connected directly to the body of the vehicle or to the mud guard $g$ as shown in Fig. 3, it being understood of course that there is little or no lateral turning movement of the wheels relatively to the body to be allowed for as in the case of the front wheel attachment, while the rear splash guard $c$ also will be retained at all times in a parallel position relatively to the road surface. The bearing $b$ in its preferred form comprises two parts fitting around or lined with, a two-part channel shaped antifriction ring $k$ adapted to fit in a correspondingly shaped recess or channel provided in or on the hub or wheel cap (see Fig. 4) thus avoiding any special fitting and obviating the employment of ball or roller bearings. The links $d$ may also be made to slide through pivoted sockets on the ends of the arms $b'$ with nuts $l$ $l$ for locking the parts together while allowing for any vertical setting or adjustment of the guard which it may be required to make.

What I claim and desire to secure by Letters Patent of the United States is:—

1. Side splash guards for the wheels of road vehicles, each comprising a guard adapted to lie parallel to the wheels and below the hub thereof, a bearing on said hub from which said guard is suspended, and a control device comprising a member mounted on said bearing, a rod engaging said member, and means extended from the vehicle and connecting to said rod so as to maintain the guard in a predetermined position relatively to the wheel and to the road surface.

2. Side splash guards for the wheels of road vehicles, each comprising a guard adapted to lie parallel to the wheel and below the hub thereof, a bearing on said hub from which said guard is suspended, and a control device comprising a bifurcated member secured to said bearing, a rod slidably mounted in said member, and means for said rod attached to the vehicle in such a manner that the relative movement of the wheel to the vehicle will not disturb the guard.

3. Side splash guards for the wheels of road vehicles, each comprising a guard adapted to lie parallel to the wheel and below the hub thereof, a bearing on said hub from which said guard is suspended, and a control device comprising a forked member pivoted to said bearing, a rod engaging and slidable relatively to the forked member, and an arm connecting with said rod and with the vehicle to permit of relative movement between the vehicle and wheels.

4. Side splash guards for the wheels of road vehicles, each comprising a guard mounted below the wheel hub and parallel to the wheel, an antifriction bearing on said hub from which the guard is supported, and a control device comprising a yoke piece pivotally connected to said bearing, a vertical rod engaging and slidable relatively to said yoke piece, a telescopic lever arm fulcrumed on the vehicle and connecting with said rod and a spring on said rod arranged between the lever arm and yoke piece.

HARRY VOLLER NORRIS GRAVELEY.

Copies of this patent may be obtained for five cents each, by addressing the "Commissioner of Patents, Washington, D. C."